(12) United States Patent
Sutherland et al.

(10) Patent No.: US 12,353,260 B2
(45) Date of Patent: Jul. 8, 2025

(54) DYNAMICALLY COOLING SYSTEM ON A CHIP HARDWARE

(71) Applicant: Microsoft Technology Licensing, LLC, Redmond, WA (US)

(72) Inventors: David Michael Sutherland, Tucson, AZ (US); Andrew Charles Banks, Renton, WA (US); Jonathan Robert Pease, Seattle, WA (US); Nikita Ramesh Wanjale, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 18/074,353

(22) Filed: Dec. 2, 2022

(65) Prior Publication Data
US 2024/0184342 A1 Jun. 6, 2024

(51) Int. Cl.
*G06F 1/32* (2019.01)
*G06F 1/20* (2006.01)
*G06F 1/3206* (2019.01)
*G06F 9/50* (2006.01)

(52) U.S. Cl.
CPC ............ *G06F 1/206* (2013.01); *G06F 1/3206* (2013.01); *G06F 9/5094* (2013.01)

(58) Field of Classification Search
CPC .................................... G06F 1/32; G06F 1/26
See application file for complete search history.

(56) References Cited

U.S. PATENT DOCUMENTS

| | | | | |
|---|---|---|---|---|
| 7,952,368 B1 * | 5/2011 | Dai | ..................... | G01R 31/2635 374/178 |
| 2006/0103011 A1 * | 5/2006 | Andry | ................. | H01L 25/0657 257/E23.098 |
| 2012/0175524 A1 * | 7/2012 | Greuel | ...................... | G01J 1/44 250/395 |
| 2012/0193131 A1 * | 8/2012 | Kusakawa | ............. | H05K 1/056 156/308.2 |
| 2014/0245032 A1 * | 8/2014 | Vadakkanmaruveedu | | .................. G06F 1/324 713/300 |
| 2019/0113287 A1 * | 4/2019 | Hachiya | ................ | H01L 23/427 |
| 2021/0089364 A1 * | 3/2021 | Blankenburg | ...... | G06F 11/3062 |
| 2021/0262958 A1 * | 8/2021 | Shabbir | .................. | G01N 25/18 |
| 2022/0214728 A1 * | 7/2022 | Marz | ....................... | G06F 1/206 |

* cited by examiner

*Primary Examiner* — Phil K Nguyen
(74) *Attorney, Agent, or Firm* — Rainier Patents, P.S.

(57) ABSTRACT

The present disclosure relates to systems, methods, and computer-readable media for managing a cooling system to based on dynamic power and temperature conditions of computing hardware (e.g., a system on a chip (SOC), respective hardware blocks on the SOC). For example, systems described herein involve tracking real-time power and temperature conditions of computing hardware and determining a dynamic cooling level to actuate in maintaining a desired temperature of the computing hardware. This is done in a way that preserves long-term durability of the cooling system while maintaining the ability of the cooling system to respond to a potential spike in power consumption by the computing hardware.

21 Claims, 7 Drawing Sheets

DYNAMICALLY COOLING SYSTEM ON A CHIP HARDWARE

BACKGROUND

Recent years have seen a rise in the use of computing devices (e.g., mobile devices, personal computers, gaming consoles) to receive, store, process, display, and provide digital media for consumption. Indeed, it is now common for consumer electronic devices to provide high performance processing and high-quality video and graphic displays when executing a variety of applications. As capabilities of computing devices continues to increase and as hardware on said devices becomes more complex, demand for more capable and sophisticated cooling systems continues to increase.

Nevertheless, conventional cooling systems suffer from a number of limitations and drawbacks. For example, many cooling devices can be quite noisy and distracting for an individual user of a computing device. In addition, while cooling systems provide a valuable mechanism for maintaining a safe operational temperature of electronic components, overuse of a cooling system can cause the cooling system to break down or become less effective over time. Moreover, as computing devices and cooling systems become more complex, conventional systems for managing when and how long cooling systems should be activated are often sporadic or non-responsive to immediate cooling needs of electronic hardware.

These and other problems exist with regard to managing temperature of electronic components and operation of a cooling system that is configured to regulate the temperature of the electronic components.

DETAILED DESCRIPTION

Figure 1:
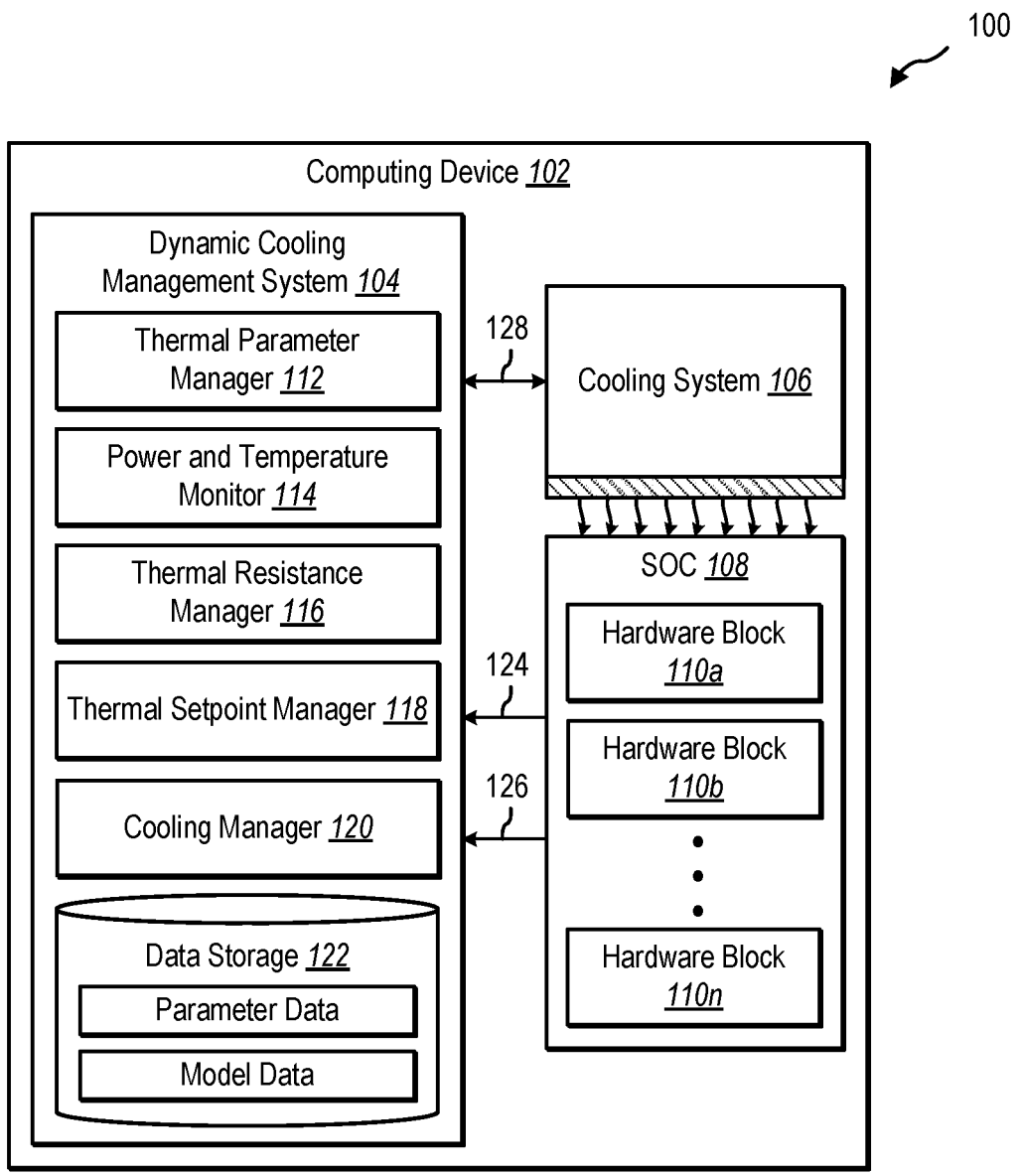
FIG. 1 illustrates an example computing device including a dynamic cooling management system implemented thereon in accordance with one or more embodiments.

The present disclosure is generally related to managing a cooling system to based on dynamic power and temperature conditions of computing hardware (e.g., an SOC, SOC blocks). In particular, the present disclosure describes a dynamic cooling management system that tracks real-time power and temperature conditions to determine a dynamic thermal resistance of the computing hardware and, based on the real-time conditions and the dynamic thermal resistance, determines a cooling level to actuate in maintaining a desired temperature of the computing hardware. As will be discussed in further detail below, the dynamic cooling management system may incorporate features and functionality to dynamically establish a thermal setpoint that maintains a desired temperature while still maintaining the ability to respond to a potential spike of power consumption by the computing hardware.

As an illustrative example, a dynamic cooling management system may identify a maximum thermal power parameter (e.g., a maximum thermal temperature) for a system on a chip (SOC) hardware on a computing device (e.g., a gaming console). The dynamic cooling management system may determine real-time thermal conditions (e.g., real-time power and temperature metrics) of the SOC hardware. Based on the real-time metrics, the dynamic cooling management system may determine a dynamic thermal resistance of the SOC hardware, which may be used in determining a thermal setpoint associated with a goal temperature of the SOC hardware. The dynamic cooling management system may actuate a cooling device (e.g., a fan) at a particular cooling level (or series of cooling levels) based on the determined thermal setpoint.

The present disclosure includes a number of practical applications that provide benefits and/or solve problems associated with managing a cooling system for maintaining a range of temperatures for computing hardware (e.g., SOC hardware). Examples of some of these applications and benefits are discussed in further detail below.

For example, by dynamically determining a thermal setpoint based on real-time conditions of the SOC hardware, the dynamic cooling management system may generally reduce expense of power consumption over conventional cooling systems that perform cooling tasks based on an overly conservative cooling policy. For example, where many conventional approaches employ a conservative approach in which a cooling system aggressively cools the SOC hardware to simply ensure that the SOC hardware does not reach a high or dangerous temperature, the present disclosure employs a more intelligent approach that considers real-time power and temperature conditions as well as a dynamic thermal resistance of the SOC hardware. This intelligent approach reduces the amount of cooling that is performed over time, thus reducing the consumption of power by the computing device over conventional systems.

In addition to reducing power consumption, this reduction in the amount of cooling will often extend the life of the cooling system and SOC hardware over conventional systems that employ more conservative cooling policies. Indeed, many conventional cooling systems will break down over time due to overuse or overly aggressive cooling policies. In contrast, the dynamic cooling management system determines a setpoint based on dynamic conditions of the SOC hardware, resulting in less aggressive cooling over time, and ultimately prolonging the life of the cooling hardware without reducing the lifetime of the SOC hardware or risking that the SOC hardware overheat.

In addition, by selectively running the cooling system and by implementing a cooling mechanism based on a dynamic thermal setpoint, the dynamic cooling management system reduces noise emitted by a computing device as a result of the cooling system. This reduction of noise further improves the user experience, particularly in applications where the computing device (e.g., a gaming device) provides high quality video and other multi-media content to be consumed by one of more users.

As will be discussed in further detail below, the dynamic cooling management system accomplishes the above benefits while allowing the cooling system to accommodate spikes in power on the computing device. For example, as will be discussed herein, the dynamic cooling management system determines a thermal setpoint based on a difference between a maximum thermal power parameter and a current thermal setpoint, which is determined based on the real-time power and temperature metrics. This difference provides an acceptable operating temperature of the SOC hardware while considering the maximum possible spike in power consumption between a present operating condition of the SOC hardware and a maximum power consumption capability of the SOC hardware.

The dynamic cooling management system further improves upon conventional systems by considering the dynamic nature of the thermal resistance for the SOC hardware in a system where power and/or temperature conditions are often in flux over time. For example, where a conventional system may assume a relatively steady state of power and/or temperature that allows the temperature of the computing hardware to converge to a steady state over time, determining a dynamic thermal resistance based on current conditions of the SOC hardware allows for the cooling device to more accurately determine a thermal setpoint that accomplishes the above benefits. This is particularly useful in systems where power consumption changes over time based on unique characteristics of an application and/or computing device.

The above benefits are particularly useful in systems where performance (e.g., processing performance, graphics performance, video frame rate) are prioritized. For example, by intelligently selecting a thermal setpoint based on real-time metrics and the dynamic nature of the thermal resistance, the dynamic cooling management system can effectively perform cooling on a system where throttling performance of one or more hardware components (e.g., CPU, GPU) is not a viable option. Indeed, where a computing device is a gaming console (or other computing device that prioritizes performance), the computing device may not be configured to perform processor throttling. In this example, dynamically determining a thermal setpoint and ensuring proper cooling has exceptionally high value, which features and functionalities of the dynamic cooling management system accomplish.

As illustrated in the foregoing discussion, the present disclosure utilizes a variety of terms to describe features and advantages of the systems herein. Additional detail and examples are now provided regarding the meaning of some example terms.

For example, as used herein, a "computing device" refers to one or more devices on which an SOC and cooling system are implemented. The computing device may refer to a variety of computing devices including, by way of example, a mobile device, such as a laptop, desktop, phone, tablet, or other device. The computing device may also be a non-mobile device, such as a server node, desktop computer, gaming console, or other non-hand-held computing device.

In one or more embodiments described herein, a computing device refers specifically to a computing device that does not have the capability (or which is not specifically configured) to throttle power consumption (e.g., processing power, graphics performance) in a way that intentionally reduces performance of the computing device. For example, in one or more embodiments, the computing device refers to a gaming device (e.g., a gaming console) on which various multi-media applications can run in serving multi-media content to a user of the computing device and which is not configured to throttle GPU, CPU, or other processing block performance.

As used herein, a "SOC hardware" may refer to some or all of an SOC. For example, in one or more embodiments, the SOC hardware refers to a hardware block of a SOC, such as a CPU, a GPU, or other sub-component or sub-system of the SOC. Indeed, the SOC hardware may refer to any discrete hardware portion of the SOC that can draw a different amount of power from other hardware portions of the SOC. In one or more embodiments, the SOC hardware refers to a set of hardware blocks within a single packaging (e.g., the entire SOC or group of hardware blocks).

As used herein, a "thermal power parameter" may refer to any feature associated with hardware of an SOC. For example, a maximum thermal power parameter may refer to a maximum thermal power that an SOC hardware is configured to tolerate (and which corresponds to a highest tolerable operating temperature of the SOC hardware). This may be a fixed temperature, a maximum power draw, a combination of power and temperature, or a thermal metric that is a function of power and temperature that the SOC hardware is configured to tolerate. In one or more embodiments, the thermal power parameter(s) is stored on a storage resource (e.g., flash memory) of the SOC, which is accessible to the one or more components of the dynamic cooling management system.

As used herein, a "dynamic thermal resistance" is a metric indicating a thermal property that arises at the interface of the SOC and a cooling system on a computing device. As will be discussed in further detail below, the dynamic thermal resistance may be a function of a thermal constant and real-time temperature and power metrics for the SOC hardware observed over a duration of time.

As used herein, a "cooling system" may refer to one or more cooling devices that may be actuated to cool or otherwise manage a temperature of an SOC hardware. In one or more embodiments described herein, a cooling system includes one or more cooling fans that are positioned and configured to cool SOC hardware based on generated cooling instructions. The cooling system may cool SOC hardware at various cooling levels, with a higher cooling level corresponding to a higher rotations per minute (RPM) of the cooling device(s) and a lower cooling level corresponding to a lower RPM of the cooling device(s). The cooling system may be configured to operate across a variety of cooling levels depending on a difference between a current temperature and a goal temperature of the SOC hardware.

Additional detail will now be provided regarding examples of a dynamic cooling management system in relation to illustrative figures portraying example implementations. For example, FIG. 1 illustrates an example computing environment 100 including a computing device 102 having a dynamic cooling management system 104 implemented thereon. As will be discussed in further detail below, the dynamic cooling management system 104 may be configured to manage operation of a cooling system 106 in cooling or otherwise maintaining the temperature of a system on a chip (SOC) hardware 108 (or simply, "SOC 108").

As indicated above, the computing device 102 may refer to any of a variety of computing devices having hardware thereon that is cooled by a cooling system. In one or more embodiments described herein, the computing device 102 is a gaming console or gaming device in which performance is prioritized and which is not configured to throttle processor performance. Nevertheless, it will be appreciated that the computing device 102 may refer to any computing device in which a cooling system 106 is implemented. More specifically, the computing device 102 may refer to any computing device on which throttling performance is not permitted or otherwise performed (e.g., where the computing device is not configured to throttle processing speed or video performance, such as by temporarily reducing a clock cycle or other performance metric by one or more processors or hardware blocks on the SOC 108). In one or more embodiments, the computing device 102 refers to a server device on the cloud computing system, such as a server device being configured to process and serve multi-media content to end-user devices, such as a streaming device, local console, or any other computing device having a connection to the cloud computing system.

The cooling system 106 may refer to a variety of cooling systems or devices. In one or more embodiments described herein, the cooling system 106 is specifically a system of one or more fans that are configured to cool components of the SOC 108 using cooling air.

The cooling system 106 may cool the SOC 108 at one or more cooling levels. As will be discussed in further detail below, a cooling level may be set or initiated based on a target temperature (e.g., a thermal setpoint) and/or a current temperature of the SOC 108. For example, a higher cooling level may apply a greater quantity of cooling (e.g., actuate a fan at a higher rotations per minute (RPM) speed or at a lower set temperature) than a lower cooling level. Conversely, a lower cooling level may apply a lower quantity of cooling, such as actuating a fan at a lower RPM relative to a higher cooling level. It will be appreciated that a cooling system 106 may employ any number of cooling levels to cool the SOC 108 to specific temperatures and/or at faster or slower cooling rates.

As shown in FIG. 1, the cooling system 106 may cool the SOC 108. In one or more embodiments, the same cooling system 106 is used for cooling any number of hardware blocks 110a-n that make up the SOC 108. As discussed herein, the hardware blocks 110a-n may refer to different processing unites or differently powered modules (e.g., modules that draw different quantities of power from a supply power of the computing device 102) of the SOC 108. For example, as will be discussed in connection with examples below, a first hardware block 110a may refer to a CPU block while a second hardware block 110b may refer to a GPU block. As shown in FIG. 1, the SOC 108 may include any number of hardware blocks 110a-b, which may include multiple CPU, GPU, or other types of processing hardware.

As will be discussed in further detail below, the hardware blocks 110a-n may operate at different temperatures depending on different demands of the computing device 102 and different draws of power at any point in time. Indeed, it may be common for a first hardware block 110a (e.g., a CPU block) or a second hardware block 110b (e.g., a GPU block) to run at a higher temperature and draw more power than other hardware blocks due to higher processing demands on the first and/or second hardware blocks 110a-b. As will be discussed below, the cooling system 106 may cool the SOC 108 based on the combined heat of these blocks or, in many cases, based on a single one or two of the hardware blocks. For example, in one or more embodiments described herein, the cooling system 106 may apply a particular cooling level based on which of the hardware blocks 110a-n are drawing the most power or which otherwise command a higher cooling level, even where other hardware blocks are not necessarily drawing as much power as the higher performing hardware block.

Additional detail will now be discussed briefly in connection with components of the dynamic cooling management system 104. As shown in FIG. 1, the dynamic cooling management system 104 may include a thermal parameter manager 112, a power and temperature monitor 114, a thermal resistance manager 116, a thermal setpoint manager 118, and a cooling manager 120. The dynamic cooling management system 104 may additionally include a data storage 122 having various types of data (e.g., parameter data, model data) maintained on the dynamic cooling management system 104 or otherwise accessible to components 112-120 of the dynamic cooling management system 104.

The components 112-120 of the dynamic cooling management system 104 can include software, hardware, or both. For example, the components 112-120 of the dynamic cooling management system 104 can include one or more instructions stored on a computer-readable storage medium and executable by processors of one or more computing devices (e.g., server device(s), gaming console(s)). When executed by the one or more processors, the computer-executable instructions of the dynamic cooling management system 104 can cause the computing device 102 to perform one or more methods or series of acts described herein. Alternatively, the components 112-120 of the dynamic cooling management system 104 can comprise hardware, such as a special purpose processing device to perform a certain function or group of functions. Additionally, or alternatively, the components 112-120 of the dynamic cooling management system 104 can include a combination of computer-executable instructions and hardware.

As mentioned above, the dynamic cooling management system 104 may include a thermal parameter manager 112. The thermal parameter manager 112 may collect initial parameters that are associated with the SOC 108 (or respective hardware blocks 110a-n of the SOC 108). For example, the thermal parameter manager 112 may obtain a maximum thermal power parameter indicating a highest possible thermal power that the SOC 108 (or respective hardware blocks 110a-n) is configured to draw. In one or more embodiments described herein, the maximum thermal power parameter refers to an amount of power that the SOC 108 can draw without exceeding a maximum allowable junction temperature of the SOC 108. Indeed, the maximum thermal power parameter may refer to a maximum drawable power that the SOC 108 is configured to draw without overheating or operating above a temperature that poses a risk or danger to performance of the hardware blocks 110a-n.

In addition to the maximum thermal power parameter, the thermal parameter manager 112 may obtain a parameter associated with a thermal resistance of the SOC 108. For example, the thermal parameter manager 112 may obtain a thermal resistance associated with a default or initial state of the SOC 108. Because the resistive properties of the SOC 108 may change over time (e.g., based on age, operating conditions, environmental conditions, etc.), the thermal parameter manager 112 may determine a thermal constant based on a combination of signals, at least one of which may be obtained by the thermal parameter manager 112 based on hardware specifications of the SOC 108. In one or more embodiments, the thermal parameter manager 112 obtains a thermal resistance constant (or other hardware-specific metric), which may be considered in combination with dynamically obtained metrics described below in determining a thermal resistance of the SOC 108 at any point in time.

As mentioned above, the dynamic cooling management system 104 includes a power and temperature monitor 114 (or simply "monitor 114"). In one or more embodiments, the monitor 114 monitors real-time power conditions of the SOC 108. For example, the monitor 114 may track a real-time power metric indicating an amount of power that the SOC 108 (or individual hardware block(s)) is drawing at any given moment in time. In one or more embodiments, the monitor 114 tracks a power metric for each of the respective hardware blocks 110a-n. In one or more embodiments, the power metric is observed at and received from the SOC 108. In one or more embodiments, the monitor 114 receives power instructions from an application or other hardware that is driving the respective hardware blocks 110a-n. It will be understood that the real-time power metrics may be different for the different hardware blocks 110a-n at any given point in time.

Similarly, the monitor 114 may monitor real-time temperature conditions of the SOC 108. For example, the monitor 114 may track a real-time temperature metric indicating a measured temperature for the SOC 108. In one or more embodiments, the monitor 114 tracks a temperature metric for each of the respective hardware blocks 110a-n. The monitor 114 may track the measurements in a variety of ways. In one or more embodiments, the monitor 114 employs one or more thermistors on each of the hardware blocks 110a-n to obtain a current temperature reading for each of the hardware blocks 110a-n. Other implementations may involve receiving temperature readings from a temperature indicator circuit or other electronic hardware that is configured to provide a temperature value for a given component of the SOC 108.

As mentioned above, the dynamic cooling management system 104 may include a thermal resistance manager 116. The thermal resistance manager 116 may be tasked with determining a current or dynamic thermal resistance metric for the SOC 108 (or respective hardware blocks 110a-n of the SOC 108). The thermal resistance of the SOC 108 may be based on a combination of real-time thermal metrics (e.g., real-time power and/or temperature) as well as one or more of the thermal parameters previously obtained that are associated with the hardware. Additional information in connection with determining a thermal resistance of the SOC 108 will be discussed below in connection with different example implementations.

As shown in FIG. 1, the dynamic cooling management system 104 may additionally include a thermal setpoint manager 118. The thermal setpoint manager 118 may consider a combination of thermal parameters in determining the thermal resistance of the SOC 108, such as real-time power and temperature metrics, as well as the initially obtained thermal parameters associated with the hardware of the SOC 108. Indeed, the thermal setpoint manager 118 may consider a variety of metrics to determine a thermal setpoint associated with a desired or goal temperature at which the SOC 108 (or respective hardware blocks 110a-n) should be operating. In one or more embodiments, the dynamic cooling management system 104 utilizes a thermal setpoint model to determine the thermal setpoint for the SOC 108 at any point in time. Additional information associated with determining, updating, and implementing the thermal setpoint in cooling the SOC 108 will be discussed in further detail below.

As shown in FIG. 1, the dynamic cooling management system 104 includes a cooling manager 120. Upon determining or receiving the thermal setpoint, the cooling manager 120 may determine or otherwise generate cooling instructions to provide to the cooling system 106. As will be discussed below, the cooling instructions may be based on a thermal setpoint determined for the SOC 108 based on real-time power and/or temperature metrics as well as other metrics discussed herein. The cooling instructions may indicate a cooling level that the cooling system 106 should use in managing the temperature of the SOC 108 and bringing the SOC 108 in line with the thermal setpoint.

As shown in FIG. 1, each of the components and systems 104-108 may communicate with one another within the framework of the computing device 102. For example, the SOC 108 may communicate power data 124 to the dynamic cooling management system 104. As further shown, the SOC 108 can communicate temperature data 126 to the dynamic cooling management system 104. In one or more embodiments, the dynamic cooling management system 104 may read or otherwise obtain power or temperature values that are made accessible to the dynamic cooling management system 104.

As further shown, the dynamic cooling management system 104 and cooling system 106 may communicate cooling data 128 with one another. For example, the cooling data 128 may include RPM data (e.g., a current RPM of the cooling system 106) communicated by the cooling system 106 to the dynamic cooling management system 104. In addition, the cooling data 128 may include cooling instructions provided by the dynamic cooling management system 104 (e.g., the cooling manager 120) instructing the cooling system 106 as to a particular power level of target setpoint to achieve in cooling the SOC 108.

As further shown, in FIG. 1, the dynamic cooling management system 104 includes a data storage 122 including parameter data. The parameter data may include any information associated with temperature and/or power specifications of the SOC 108. For example, the parameter data may include a maximum thermal power parameter indicating a maximum thermal power for the SOC 108. The parameter data may further include one or more resistance values, such as a resistance constant or other values associated with the hardware to be considered in combination with real-time power and/or temperature parameters to determine a thermal resistance of the SOC 108.

The data storage 122 may additionally include model data. The model data may include any information about algorithms or model(s) that the dynamic cooling management system 104 uses in determining a thermal setpoint and/or cooling instructions to communicate with the cooling system 106. In one or more embodiments, the model data includes algorithm information indicating a static or dynamic algorithm for determining a thermal setpoint and/or cooling instructions. In one or more embodiments, the model data includes data and/or parameters of a machine learning model or neural network that is trained to determine a thermal setpoint based on a combination of signals and other information discussed herein.

Additional information will now be discussed in connection with an example workflow that may be performed by the dynamic cooling management system 104 in connection with determining a thermal setpoint and providing cooling instructions to a cooling system 106 for cooling components of an SOC 108. For example, FIG. 2 illustrates an illustrative workflow 200 showing an example implementation in which the dynamic cooling management system 104 actuates cooling computing hardware based on real-time power and temperature conditions of computing hardware (e.g., an SOC 108) on a computing device.

As noted above, the workflow 200 generally relates to a process that may be performed by the dynamic cooling management system 104 in determining cooling instructions to provide to a cooling system 106 in determining a specific cooling level to apply when cooling an SOC 108. In the example shown in FIG. 2, and as discussed below, the dynamic cooling management system 104 determines a thermal setpoint and generates cooling instructions based on conditions observed for the SOC 108. Nevertheless, it will be appreciated that references to temperature, power, and other metrics of the SOC 108 may similarly apply to respective hardware blocks that reside within the same SOC 108. Thus, the workflow 200 shown in FIG. 2 may be applied similarly to respective hardware blocks (e.g., hardware blocks 110a-n) of the SOC 108. For example, the workflow 200 may be applied independently to a GPU block and a CPU block to determine different cooling instructions that may be applicable to the individual blocks.

Figure 2:
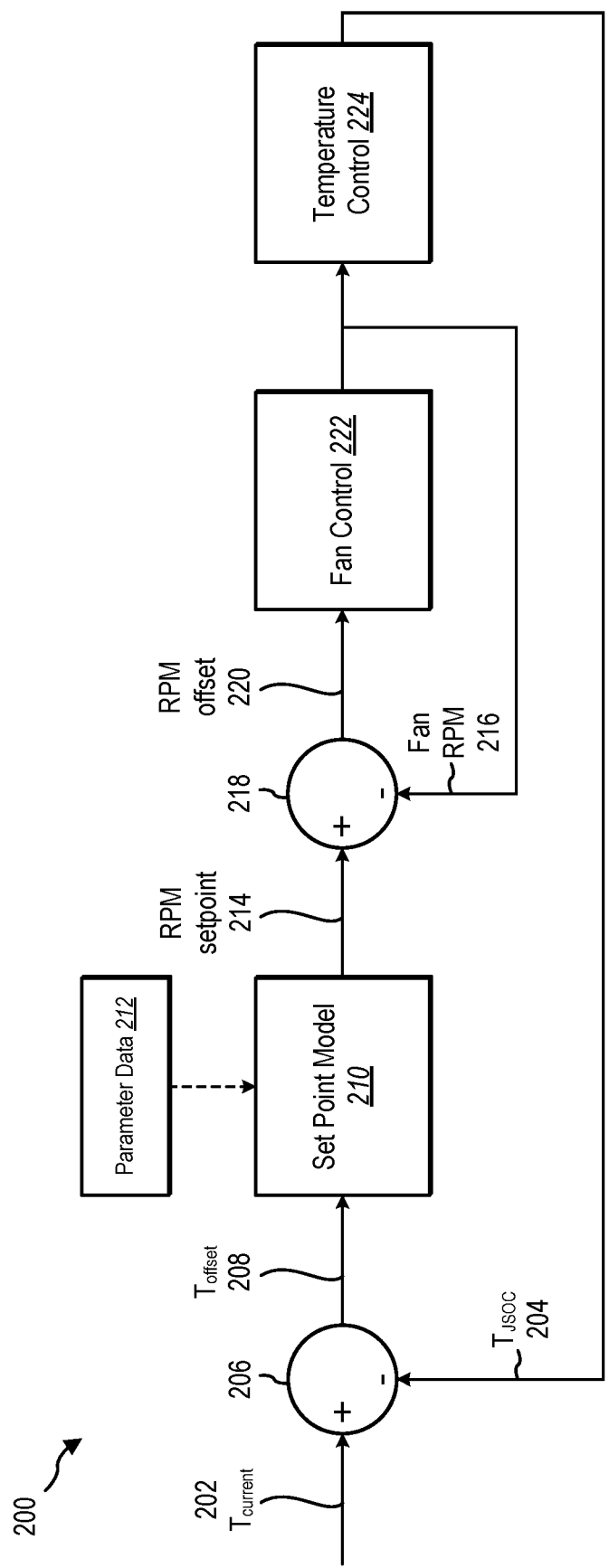
FIG. 2 illustrates an example implementation of the dynamic cooling management system for cooling system on a chip (SOC) hardware in accordance with one or more embodiments.

As shown in FIG. 2, the dynamic cooling management system 104 can receive or otherwise determine a current temperature 202 ($T_{Current}$). In this example, the current temperature 202 may refer to a current temperature (e.g., recently obtained temperature metric) reflective of a determined temperature of the SOC 108. In one or more embodiments, the current temperature 202 refers to a current temperature setting (e.g., a recently determined temperature setpoint) of the SOC 108, which may be based on one or more previously performed iterations of the workflow 200.

As shown in FIG. 2, in addition to the current temperature 202, the dynamic cooling management system 104 may receive a real-time temperature metric 204 (TJsoc). The real-time temperature metric 204 may be reflective of a real-time junction temperature captured by the SOC and/or dynamic cooling management system 104. The real-time temperature metric 204 may be reflective of a current or real-time measured temperature of the SOC 108.

The current temperature 202 and the real-time temperature metric 204 may be provided as inputs to a first offset block 206. The first offset block 206 may determine a temperature offset 208 ($T_{Offset}$) between the respective temperatures 202 and 204. In this example, the temperature offset 208 may represent a difference between a previous thermal setpoint (or temperature value corresponding to a thermal setpoint) and a real-time measured temperature for the SOC 108.

While FIG. 2 shows an example implementation in which the current temperature 202 and the real-time temperature 204 are provided as inputs to determine a temperature offset 208, these temperature metrics may refer to power metrics, temperature metrics, or a combination of temperature and power metrics for the SOC 108. For example, in one or more embodiments described herein, a thermal metric may refer to temperature metrics (e.g., degrees in Celsius or Kelvin) or may be a combination of power and/or temperature metrics. Indeed, in one or more embodiments described herein, a thermal offset is expressed as a temperature offset, or may be a product of both a temperature and power metric associated with a SOC 108.

As shown in FIG. 2, the temperature offset 208 may be provided as an input to a set point model 210 for determining a thermal setpoint of the SOC 108. While additional information associated with implementation of the setpoint model 210 will be discussed below (e.g., in connection with FIGS. 3-4), as shown in FIG. 2, the setpoint model 210 may be trained or otherwise configured to determine cooling instructions based on a temperature offset 208 and parameter data 212.

To illustrate, the setpoint model 210 may receive parameter 212 received or otherwise obtained from the SOC 108 (e.g., from a flash storage on the SOC 108). The parameter data 212 may indicate thermal resistance parameters (e.g., thermal resistance constant(s)), a maximum thermal power parameter, an age or condition of the SOC 108, environmental conditions of the SOC 108, and any other information associated with the SOC 108. The setpoint model 210 may be trained to receive a given offset temperature and determine cooling instructions to implement based on a combination of the given offset temperature and parameter data associated with a given SOC 108. Additional information detailing how the setpoint model 210 is used to determine a thermal setpoint and (based on the thermal setpoint) generate cooling instructions will be discussed in further detail below (e.g., in connection with FIGS. 3-4).

As just mentioned, the setpoint model 210 may output cooling instructions to be implemented by a cooling system 106 in actuating cooling of the SOC 108. In this example, the cooling system 106 may refer specifically to a cooling fan or system of cooling fans that are capable of cooling the SOC 108. These fans may be configured to operate at different cooling levels corresponding different RPMs and/or air temperatures and may be positioned to cool the SOC hardware directly.

As shown in FIG. 2, the dynamic cooling management system 104 may determine an RPM setpoint 214. The RPM setpoint 214 may refer to a target RPM of a cooling fan (e.g., one or multiple cooling fans). This target RPM may refer to a cooling level of the cooling fan(s) that corresponds to a thermal setpoint. For example, the RPM setpoint 214 may refer to an RPM of the cooling fan that represents an equilibrium RPM that will achieve a target temperature for the SOC. In one or more embodiments, the RPM setpoint 214 refers to an initial RPM that the cooling fan will need to turn to in order to initiate cooling to a target temperature. In either example, the RPM setpoint 214 refers to an RPM of the cooling fan(s) in which the cooling fan(s) will cool the SOC 108 at an acceptable temperature while maintaining high performance and while providing a sufficient difference below a thermal maximum parameter to accommodate an event in which the SOC 108 experiences a spike in power consumption.

As shown in FIG. 2, the RPM setpoint 214 is provided as an input to a second offset block 218 in addition to a fan RPM 216 representative of a real-time RPM metric (e.g., a currently measured RPM) that is measured or otherwise received from the cooling system 106. The second offset block 218 may output an RPM offset 220 representing a difference between the target RPM (e.g., the RPM setpoint 214) and the current measurement of the RPM (e.g., the fan RPM 216).

As shown in FIG. 2, the RPM offset 220 is provided to a fan control 222. The fan control 222 may include hardware and software on the cooling system 106 and/or dynamic cooling management system 104 for controlling operation of the cooling fan(s). In particular, upon receiving the RPM offset 220, the fan control 222 may determine a PWM duty cycle for the cooling fan(s), which may consider an integral or average of past, present and future RPM values to determine an immediate or series of output command (e.g., a PWM duty cycle) for the cooling fan(s). In one or more embodiments, the fan control 222 implements a proportional integral derivative (PID) controller in which a control loop mechanism employing feedback is used to determine specific instructions to be actuated by the cooling fan(s).

As shown in FIG. 2, the fan control 222 may output the fan RPM 216, which is provided as input to the second offset block 218 (discussed above). In addition, the fan RPM 216 may be provided as input to a temperature control 224. The temperature control 224 may determine a real-time temperature of the SOC 108 and output a real-time temperature metric 204. As discussed above, the real-time temperature metric 204 may be provided as an input to the first offset block 206 to be considered in determining the temperature offset 208.

It will be appreciated that the specific workflow 200 shown in FIG. 2 is provided by way of example in connection with a cooling fan that cools SOC hardware using a controlled feedback loop and based on features of a conventional cooling fan. It will be appreciated that features of the dynamic cooling management system 104, and particularly the setpoint model 210 may be implemented in any cooling environment in which a target temperature is determined and instructions can be generated and executed to bring a temperature of electronic hardware to the target temperature. Thus, while features of the examples shown in FIG. 2 are discussed in connection with a cooling fan, the setpoint model 210 and dynamic cooling management system 104 may be implemented in a variety of cooling systems and based on other types of cooling level metrics beyond or in addition to a cooling fan RPM.

Additional detail will now be discussed in connection with a series of acts that may be performed by the dynamic cooling management system 104. More specifically, FIG. 3 illustrates a series of acts that may be performed in part or wholly by the setpoint model 210 discussed above in connection with FIG. 2.

Figure 3:
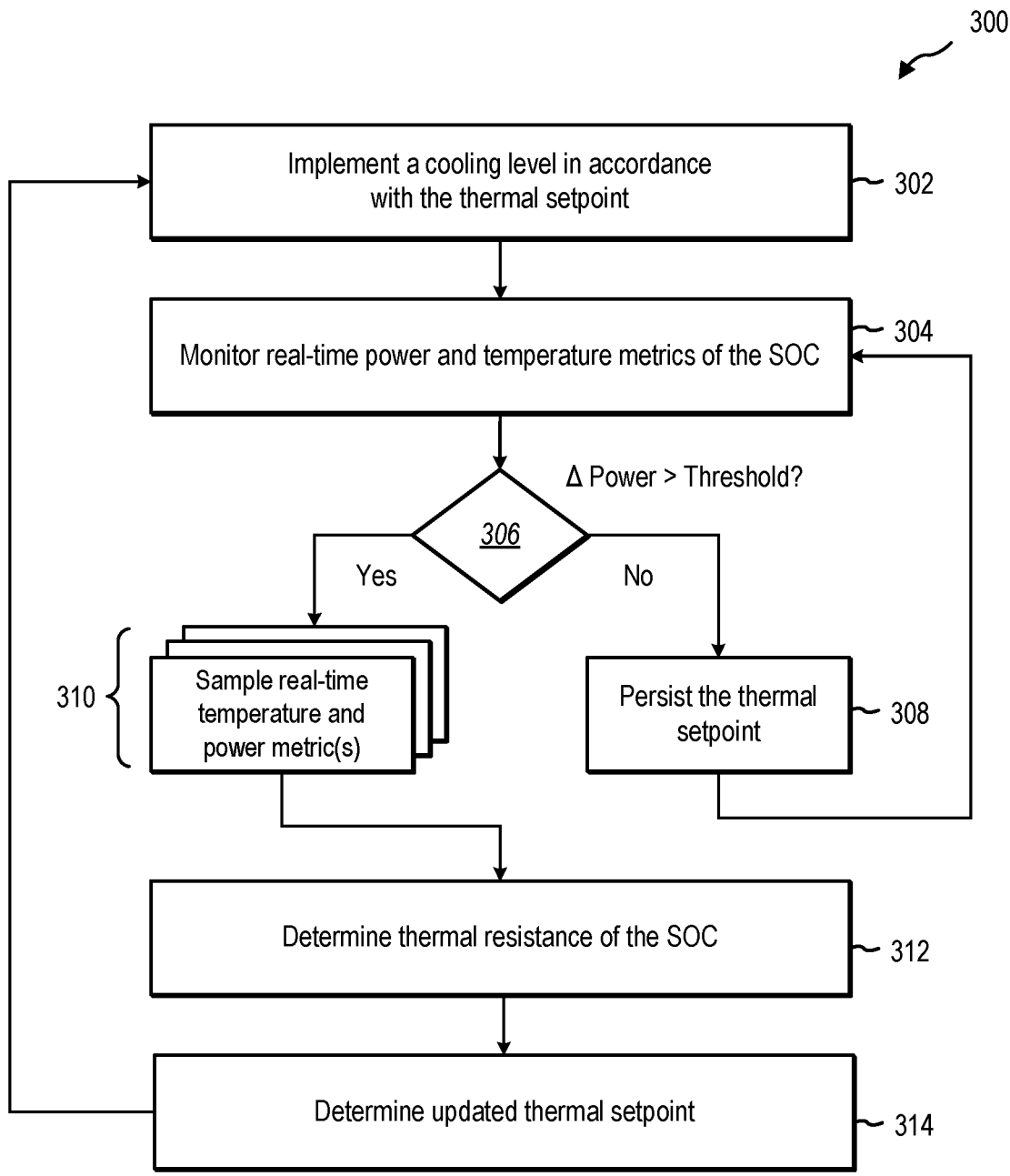
FIG. 3 illustrates an example series of acts that may be performed by the dynamic cooling management system in determining a thermal setpoint based on real-time temperature and power data for SOC hardware.

FIG. 3 illustrates an example series of acts 300 in which the dynamic cooling management system 104 may determine whether to update a thermal setpoint or to maintain a current thermal setpoint in generating and providing cooling instructions to a cooling system 106. As noted above, the series of acts 300 shown in FIG. 3 may correspond to acts performed within block 210 in the example workflow 200 described above in connection with FIG. 2.

As shown in FIG. 3, the dynamic cooling management system 104 may perform an act 302 of implementing a cooling level in accordance with the thermal setpoint. In one or more embodiments, this setpoint refers to an initial setpoint or any previously established setpoint determined by the dynamic cooling management system 104. This thermal setpoint may be based on thermal parameters and/or previously obtained real-time power and temperature metrics of the SOC 108. As will be discussed in further detail below, this thermal setpoint may further be based on an updated thermal setpoint (e.g., in response to detecting a trigger condition that causes the dynamic cooling management system 104 to modify a previously persisted or otherwise established thermal setpoint).

As shown in FIG. 3, the dynamic cooling management system 104 may perform an act 304 of monitoring real-time power and temperature metrics of the SOC 108. As noted above, the dynamic cooling management system 104 may receive real-time power and temperature metrics from different hardware blocks (e.g., hardware blocks 110a-n) of the SOC 108. In one or more embodiments, the dynamic cooling management system 104 monitors changes in power and/or temperature of the SOC 108. For example, in one or more embodiments, the dynamic cooling management system 104 samples power and/or temperature metrics and determines differences over time. For example, the dynamic cooling management system 104 may monitor the real-time power and temperature metrics by sampling real-time power and temperature metrics over frequent, periodic intervals.

As shown in FIG. 3, the dynamic cooling management system 104 may perform an act 306 of determining if a change in the power metric has changed by more than a threshold amount. For example, the dynamic cooling management system 104 may determine whether a current power metric (or weighted average of recently sampled power metrics) has changed a threshold amount from a recent instance (e.g., a most recent instance) in which the thermal setpoint was last established and/or persisted.

In one or more embodiments, the change in power is measured against a percentage of power drawn by the SOC 108. In one or more embodiments, the change in power is measured against a percentage between a current power metric (e.g., a power metric corresponding to a most recently established thermal setpoint) and a maximum thermal power parameter (e.g., corresponding to a pre-set thermal power parameter). As a non-limiting example, the threshold power change may be some percentage between 10-50% (e.g., 30%) of the power metric corresponding to a recently established thermal setpoint. Other percentages may be considered in determining whether to update a thermal setpoint.

By implementing a comparison between a recent change in power against a power change threshold, the dynamic cooling management system 104 may avoid modifying a cooling level of the cooling system 106 on an overly frequent basis. Indeed, by implementing a comparison as shown in block 306, the dynamic cooling management system 104 may prevent the cooling system from constantly modifying an RPM of a cooling fan in a way that is annoying to an end-user and/or in a way that potentially reduces a lifespan of the cooling hardware and associated control system.

As shown in FIG. 3, where the dynamic cooling management system 104 determines that the change in power is not greater than the predetermined threshold, the dynamic cooling management system 104 may perform an act 308 of persisting the thermal setpoint and continuing to perform the act 304 of monitoring the real-time power and temperature metrics. Indeed, in the event that the different in power does not exceed the threshold, the dynamic cooling management system 104 may simply continue monitoring the real-time power and temperature metrics until the thermal threshold condition (e.g., a change in power beyond a threshold amount or a change in temperature beyond a threshold amount) is triggered.

Conversely, where the dynamic cooling management system 104 determines that the difference in power is greater than the predetermined threshold, the dynamic cooling management system 104 performs acts 310 of sampling a plurality of real-time temperature and power metrics.

In one or more embodiments, the dynamic cooling management system 104 samples the power and temperature metrics by taking a predetermined number (e.g., 20) of temperature metric samples to determine a recent window showing a range of temperature and power metrics for the SOC 108. In one or more embodiments, this may involve the dynamic cooling management system 104 simply obtaining the most recent set of power and temperature metric samples (e.g., from the metrics obtained when performing the act 304 discussed above). Alternatively, the dynamic cooling management system 104 may obtain a set of new samples over a brief duration of time.

In this example, the act 310 of obtaining the temperature and power samples may be performed at a faster rate than the act 304 in which real-time temperature and power metrics were monitored while the previous thermal setpoint was established and before the power consumption changed more than the threshold amount. In this manner, the dynamic cooling management system 104 may avoid expending unnecessary processing resources when the SOC 108 is maintaining a relatively steady power and temperature state.

After obtaining the temperature and power samples, the dynamic cooling management system 104 may perform an act 312 of determining a thermal resistance of the SOC 108. As mentioned above, the thermal resistance may be determined based on a function of one or more thermal parameters (e.g., resistance constants, conditions of the SOC 108, such as age of the hardware and/or various environment condition (e.g., dust, wear and tear, ambient temperature)) associated with the hardware of the SOC 108. In this way, the dynamic cooling management system 104 may determine a thermal resistance that changes over time based on conditions of the SOC 108.

In addition, the thermal resistance may be based on a combination of recent temperature metric(s) and recent power metric(s). For example, in one or more embodiments, the thermal resistance is determined to be based on a ratio of changes in temperature metric(s) over changes in power metric(s). To illustrate, in one or more embodiments, the dynamic cooling management system 104 determines a thermal resistance based on the following formula:

$$R_{thermal} = R_c \left| \frac{(T_{n+1} - T_n)}{(P_{n+1} - P_n)} \right|$$

where $R_{thermal}$ is the thermal resistance at some point in time, $R_c$ is a thermal constant based on a combination of one or more thermal resistance parameters associated with the hardware and/or environment of the SOC 108, and the T and P metrics refer to temperature and power metrics that are captured at different points in time. In one or more embodiments, the temperature and power differences are based on a weighted difference over a predetermined number of sampled values.

Upon determining the thermal resistance based on the real-time power and temperature metrics, the dynamic cooling management system 104 may perform an act 314 of determining an updated thermal setpoint. As noted above, the thermal setpoint may be function of a maximum thermal power parameter, the thermal resistance, and real-time temperature and/or power values obtained by the dynamic cooling management system 104.

For example, in one or more embodiments, the thermal setpoint is determined based on a difference between a maximum thermal power parameter and a product of the dynamic thermal resistance and a power offset. In this example, the power offset is based on a difference between a maximum power metric of the SOC hardware and a real-time power metric. Indeed, in one or more embodiments, the dynamic cooling management system 104 determines the thermal setpoint using the following formula:

$$T_{setpoint} = T_{setpointmax} - R_{thermal}(P_{max} - P_{current})$$

where $T_{setpoint}$ refers to a thermal setpoint corresponding to a goal temperature of the SOC 108, $T_{setpointmax}$ refers to a thermal setpoint corresponding to a maximum power draw of the SOC 108, $R_{thermal}$ corresponds to the dynamically determined thermal resistance as discussed above, $P_{max}$ refers to a maximum power draw for the SOC 108, and $P_{current}$ refers to a current power metric for which the thermal setpoint is being determined. The current power metric may refer to a most recent power metric or may refer to a weighted average of power metric values obtained over a recent period of time.

Once the updated thermal setpoint is determined, the dynamic cooling management system 104 may implement the cooling level of the cooling system 106 in accordance with the updated thermal setpoint. Indeed, as shown in FIG. 3, upon determining the updated thermal setpoint, the dynamic cooling management system 104 may return to act 302 and implement the cooling level (e.g., an updated cooling level) based on the current (e.g., the newly updated) thermal setpoint.

A further illustration of the features described above in connection with the acts shown in FIGS. 2 and 3 will be discussed in connection with an example shown in FIG. 4. In particular, FIG. 4 illustrates an example graph 400 showing thermal metrics (e.g., power and temperature metrics) obtained for an SOC 108 over a period of time and showing an example of how the dynamic cooling management system 104 would determine and implement different thermal setpoints based on changing thermal conditions of the SOC 108.

Figure 4:
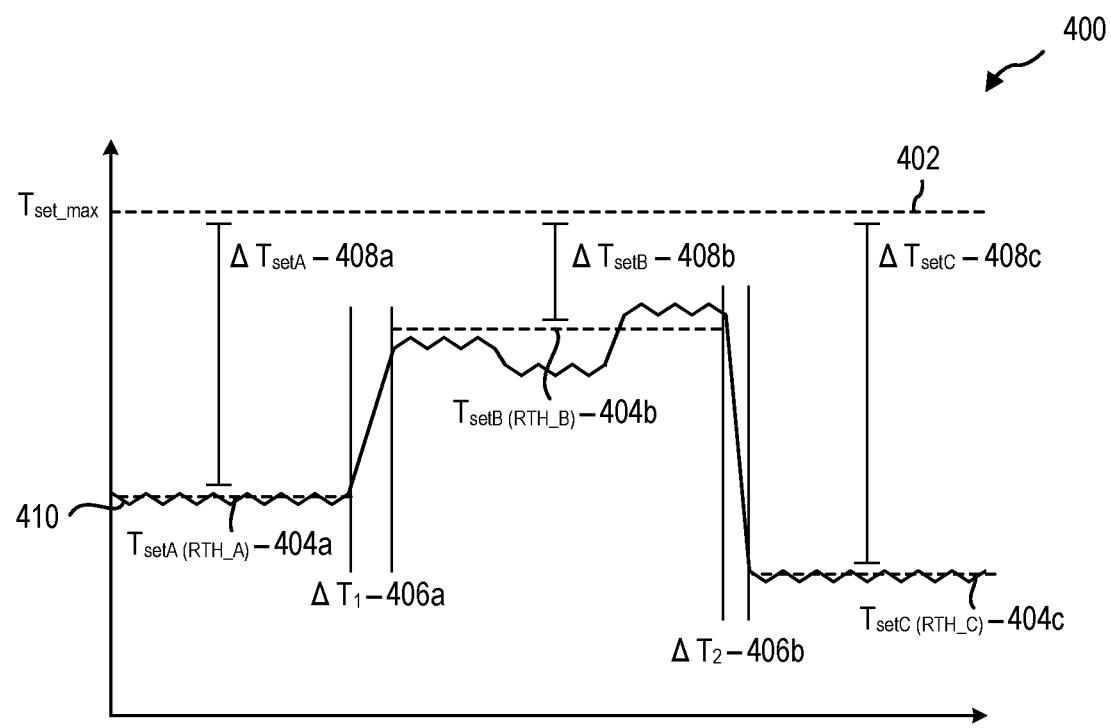
FIG. 4 illustrates an example timeline showing modification of a thermal setpoint based on changing power and temperature conditions in accordance with one or more embodiments.

As shown in FIG. 4, the dynamic cooling management system 104 may determine a maximum thermal setpoint 402 ($T_{set\ max}$). As discussed above, the maximum thermal setpoint 402 corresponds to a maximum thermal power that the SOC 108 is configured to operate (e.g., without risking hardware damage and while maintaining a high level of performance over an extended period of time).

As shown in FIG. 4, the graph 400 illustrates three different phases over respective periods of time in which the thermal setpoint is established at three different levels. For example, the graph 400 shows a first thermal setpoint 404a corresponding to a first power and/or temperature level, a second thermal setpoint 404b corresponding to a second power and/or temperature level, and a third thermal setpoint 404c corresponding to a third power and/or temperature level. As shown in FIG. 4, each of the thermal setpoints 404a-c have varying temperature differences 408a-c between the thermal setpoints 404a-c and the maximum thermal setpoint 402.

As further shown, the graph 400 illustrates a real-time thermal metric 410 indicating a measure temperature and/or power metric of the SOC 108 over the duration of time spanning the three different phases illustrated in the graph 400. As shown in FIG. 4, the temperature and/or power of the SOC 108 fluctuates over time as one or more hardware blocks of the SOC 108 draws additional or less power from a power supply.

Consistent with examples discussed above in FIG. 3, the dynamic cooling management system 104 orchestrates a transition between the different thermal setpoints 404a-c based on observed changes in the power drawn by one or more hardware blocks of the SOC 108. In the illustrated graph 400, the dynamic cooling management system 104 detects a change in the thermal metric 410 by more than a threshold amount and determines, based on this detected trigger condition, to change the thermal setpoint.

As a first example, the dynamic cooling management system 104 determines that the thermal metric 410 has increased by more than a threshold amount. Based on this determination, the dynamic cooling management system 104 samples real-time power and temperature metrics over a first transition interval 406a. In this first example, the dynamic cooling management system 104 determines and updates the thermal setpoint to a second thermal setpoint 404*b* after the first transition interval 406*a*.

As a second example, the dynamic cooling management system 104 may determine that the thermal metric 410 has decreased by more than the threshold amount. Based on this determination, the dynamic cooling management system 104 samples real-time power and temperature metrics over the second transition interval 406*b*. In this example, the dynamic cooling management system 104 determines and updates the thermal setpoint to a third thermal setpoint 404*c* after the second transition interval 406*b*.

As discussed above, and as shown in the graph 400, the dynamic cooling management system 104 may tolerate a certain level of variation in the thermal metric 410 without necessarily updating the thermal setpoint. For example, in the second phase period of time in which the second thermal setpoint 404*b* is established, the dynamic cooling management system 104 may move below and above the second thermal setpoint 404*b*. Nevertheless, because the thermal metric 410 stays within a threshold difference of the second thermal setpoint 404*b*, the dynamic cooling management system 104 may avoid recalculating a thermal setpoint and/or updated thermal resistance over the second period of time until detecting that the power drawn by one or more of the hardware blocks 110*a-n* of the SOC 108 exceeds a threshold power difference.

It will be appreciated that the illustration of the graph 400 shown in FIG. 4 is provided by way of example as a way to illustrate some of the example features and functionality of the dynamic cooling management system 104 discussed above. For example, while FIG. 4 shows three discrete thermal setpoints 404*a-c* that occur over three durations of time, it will be understood that these durations of time may be varying lengths and may not necessarily appear to be discrete thermal setpoints of the SOC 108, as may appear in the example graph 400. For example, it will be expected in many computing environments that the dynamic cooling management system 104 will frequently or more continuously recalculate the thermal setpoint based on new power and temperature data.

Additional information will now be discussed in connection with an example computing device in which the dynamic cooling management system 104 employs multiple setpoint models for determining thermal setpoints for respective hardware blocks of an SOC. As mentioned above, and as will be discussed below, the dynamic cooling management system 104 may determine and implement specific cooling instructions based on the output of the respective setpoint models.

Figure 5A:
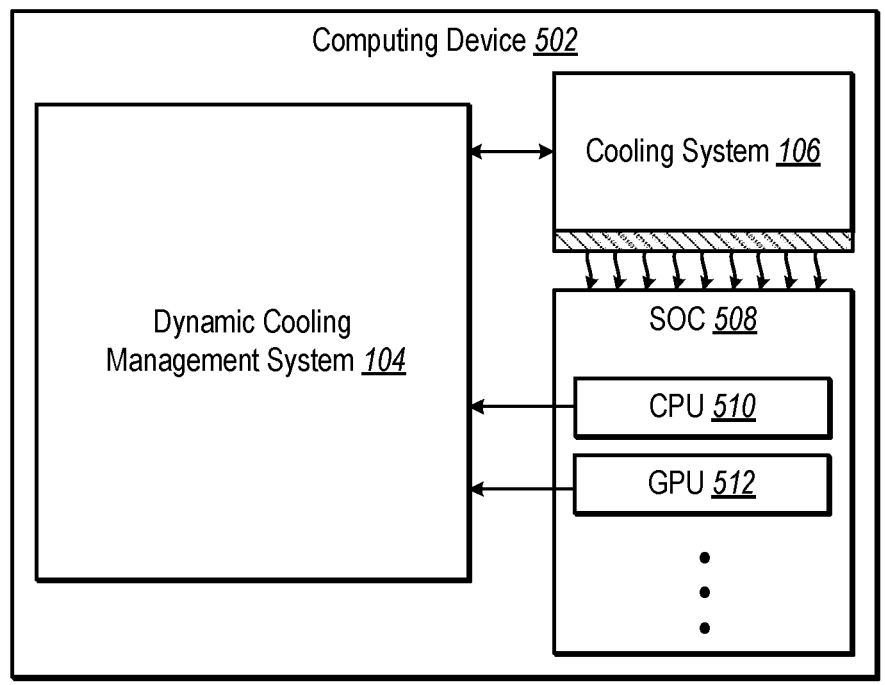
FIG. 5A illustrates another example computing environment showing a dynamic cooling management system in accordance with one or more embodiments.

In particular, FIG. 5A illustrates an example computing device 502 (e.g., a gaming console) including a dynamic cooling management system 104, a cooling system 106, and an SOC 508 having a CPU block 510 and a GPU block 512 implemented thereon. The SOC 508 may include additional hardware blocks. It will be noted that while any of the hardware blocks may determine a thermal setpoint, many implementations involve the CPU block 510 and the GPU block 512 being largely determinative of the thermal setpoint.

Figure 5B:
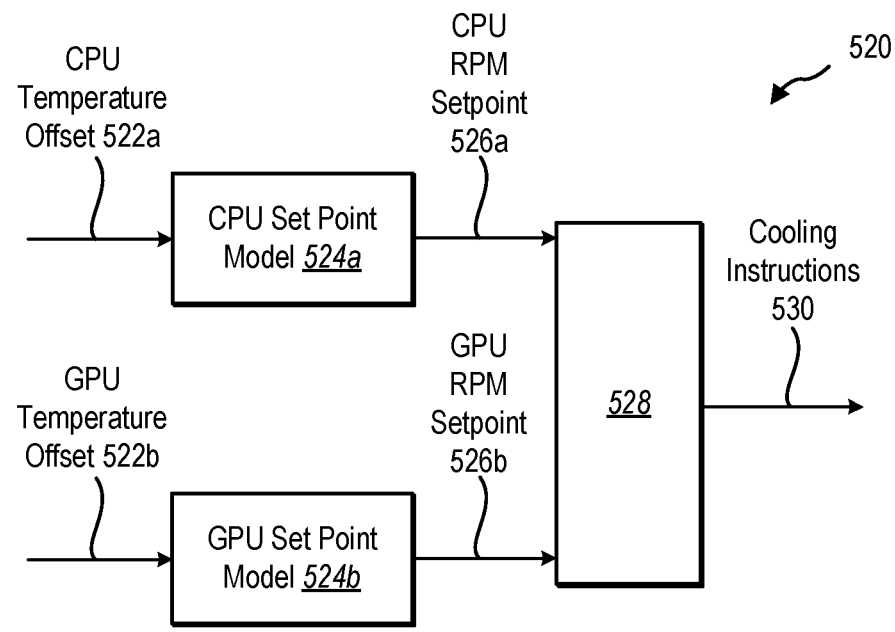
FIG. 5B illustrates an example implementation of the dynamic cooling management system for cooling hardware blocks of SOC hardware in accordance with one or more embodiments.

FIG. 5B illustrates an example implementation of the dynamic cooling management system 104 in determining a thermal setpoint to apply to the SOC 508 based on individual setpoints determined for the respective hardware blocks. In particular, FIG. 5B illustrates an example workflow 520 including a plurality of individual workflows having similar features and characteristics of the more detailed workflow 200 discussed above in connection with FIG. 2.

As shown in FIG. 5B, the workflow 520 illustrates a first workflow path in which a first setpoint model 524*a* receives a first temperature offset (e.g., a CPU temperature offset 522*a*). Similar to one or more embodiments described above, the first setpoint model 524*a* determines a first RPM setpoint (e.g., a CPU RPM setpoint 526*a*) based on a thermal setpoint determined for the CPU block 510.

As further shown, the workflow 520 illustrates a second workflow path in which a second setpoint model 524*b* receives a second temperature offset (e.g., a GPU temperature offset 522*b*). Similar to one or more embodiments described above, the second setpoint model 524*b* determines a second RPM setpoint (e.g., a GPU RPM setpoint 526*b*) based on a thermal setpoint determined for the GPU block 512.

It will be understood that the CPU block 510 and the GPU block 512 may use different setpoint models 524*a-b* having different thermal parameters and different real-time metrics provided as inputs to the respective models. For example, the CPU block 510 and the GPU block 512 (and other hardware blocks) may have different maximum thermal power parameters corresponding to different maximum power levels that the respective processing blocks can draw. The setpoint models 524*a-b* may additionally include different parameters, such as different triggering thresholds (e.g., different percentages in power drawn that trigger recalculating thermal resistances and thermal setpoints), different resistance metrics, and other instructions that influence the determination of the respective RPM setpoints.

As shown in FIG. 5B, the dynamic cooling management system 104 may provide each of the RPM setpoints 526*a-b* (and any additional RPM setpoints determined for different hardware blocks not shown) as inputs to a comparison block 528. The comparison block 528 may compare the RPM setpoints 526*a-b* and determine which of the RPM setpoints 526*a-b* to use in generating cooling instructions 530. In one or more embodiments, the dynamic cooling management system 104 determines cooling instructions 530 based on whichever of the RPM setpoints 526*a-b* is higher and corresponding to a higher cooling level. In this way, the dynamic cooling management system 104 may ensure that the cooling level is high enough to ensure that each hardware block on the SOC 508 will be cool enough to have high performance while maintaining a safe operating temperature.

Figure 6:
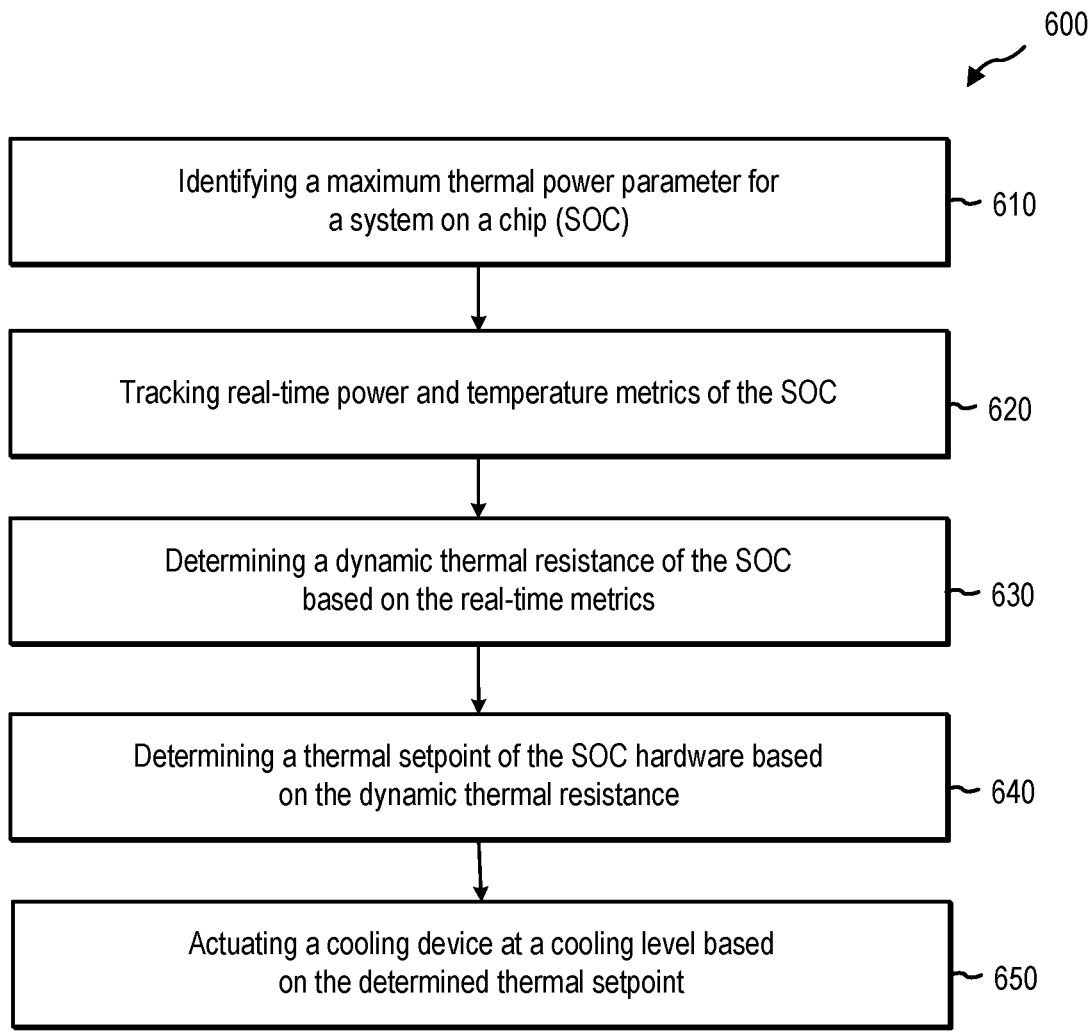
FIG. 6 illustrates a series of acts for cooling SOC hardware in accordance with one or more embodiments.

Turning now to FIG. 6, this figures illustrate example flowcharts including series of acts for determining a thermal setpoint for an SOC and executing cooling instructions in accordance with the thermal setpoint for the SOC. While FIG. 6 illustrates acts according to one or more embodiments, alternative embodiments may omit, add to, reorder, and/or modify any of the acts shown in FIG. 6. The acts of FIG. 6 can be performed as part of a method. Alternatively, a non-transitory computer-readable medium can include instructions that, when executed by one or more processors, cause a computing device to perform the acts of FIG. 6. In still further embodiments, a system can perform the acts of FIG. 6.

FIG. 6 illustrates a series of acts 600 for determining a thermal setpoint for an SOC and executing cooling instructions in accordance with the thermal setpoint. As shown in FIG. 6, the series of acts 600 includes an act 610 of identifying a maximum thermal power parameter for a system on a chip (SOC). In one or more embodiments, the act 610 involves identifying a maximum thermal power parameter for a system on a chip (SOC) hardware on a computing device.

As further shown in FIG. 6, the series of acts 600 includes an act 620 of tracking real-time power and temperature metrics of the SOC. In one or more embodiments, the act 620 involves tracking a real-time power metric and a real-time temperature metric of the SOC hardware.

As further shown in FIG. 6, the series of acts 600 includes an act 630 of determining a dynamic thermal resistance of the SOC based on the real-time metric. In one or more embodiments, the act 630 involves determining a dynamic thermal resistance of the SOC hardware based on the real-time power metric and the real-time temperature metric of the SOC hardware.

As further shown in FIG. 6, the series of acts 600 includes an act 640 of determining a thermal setpoint of the SOC hardware based on the dynamic thermal resistance. In one or more embodiments, the act 640 involves determining, based on the dynamic thermal resistance of the SOC hardware, a thermal setpoint associated with a target temperature of the SOC hardware.

As further shown in FIG. 6, the series of acts 600 includes an act 650 of actuating a cooling device at a cooling level based on the determined thermal setpoint. In one or more embodiments, the act 650 involves actuating a cooling device configured to cool the SOC hardware, wherein actuating the cooling device includes modifying a cooling level of the cooling device based on the determined thermal setpoint.

In one or more embodiments, the series of acts 600 includes identifying a thermal resistance parameter associated with the SOC hardware, the thermal resistance parameter being based on one or more conditions of the SOC hardware. The thermal resistance may be based on the thermal resistance parameter.

In one or more embodiments, tracking the real-time power metric includes sampling power drawn by the SOC hardware over a duration of time. In one or more embodiments, tracking the real-time temperature metric includes sampling temperature measurements of the SOC hardware over the duration of time. In one or more embodiments, determining the dynamic thermal resistance of the SOC hardware is based on an observed change in power drawn by the SOC hardware over the duration time and an observed change in temperature of the SOC hardware over the duration of time.

In one or more embodiments, determining the thermal setpoint is based on the maximum thermal power parameter for the SOC hardware. In one or more embodiments, determining the thermal setpoint is based on a difference between the maximum thermal power parameter and a product of the dynamic thermal resistance and a power offset, the power offset being based on a difference between a maximum power metric of the SOC hardware and the real-time power metric.

In one or more embodiments, the series of acts 600 includes determining that the real-time power metric has changed a threshold amount over a duration of time. In this example, determining the thermal setpoint may be performed in response to determining that the real-time power metric has changed the threshold amount over the duration of time.

In one or more embodiments, the cooling device is a fan system. In this example, the cooling level of the cooling device may be a rotations per minute (RPM) metric of one or more fans of the fan system. In one or more embodiments, the RPM metric includes duty cycle instructions that are determined based on the thermal setpoint associated with the target temperature of the SOC hardware.

In one or more embodiments, the maximum thermal power parameter is based on hardware specifications of the SOC hardware. In one or more embodiments, the SOC hardware is one or more of a graphics processing unit (GPU) block or computing processing unit (CPU) block of an SOC including a plurality of hardware blocks. In one or more embodiments, the computing device is a gaming console that is not configured to throttle processor performance of the SOC hardware.

Figure 7:
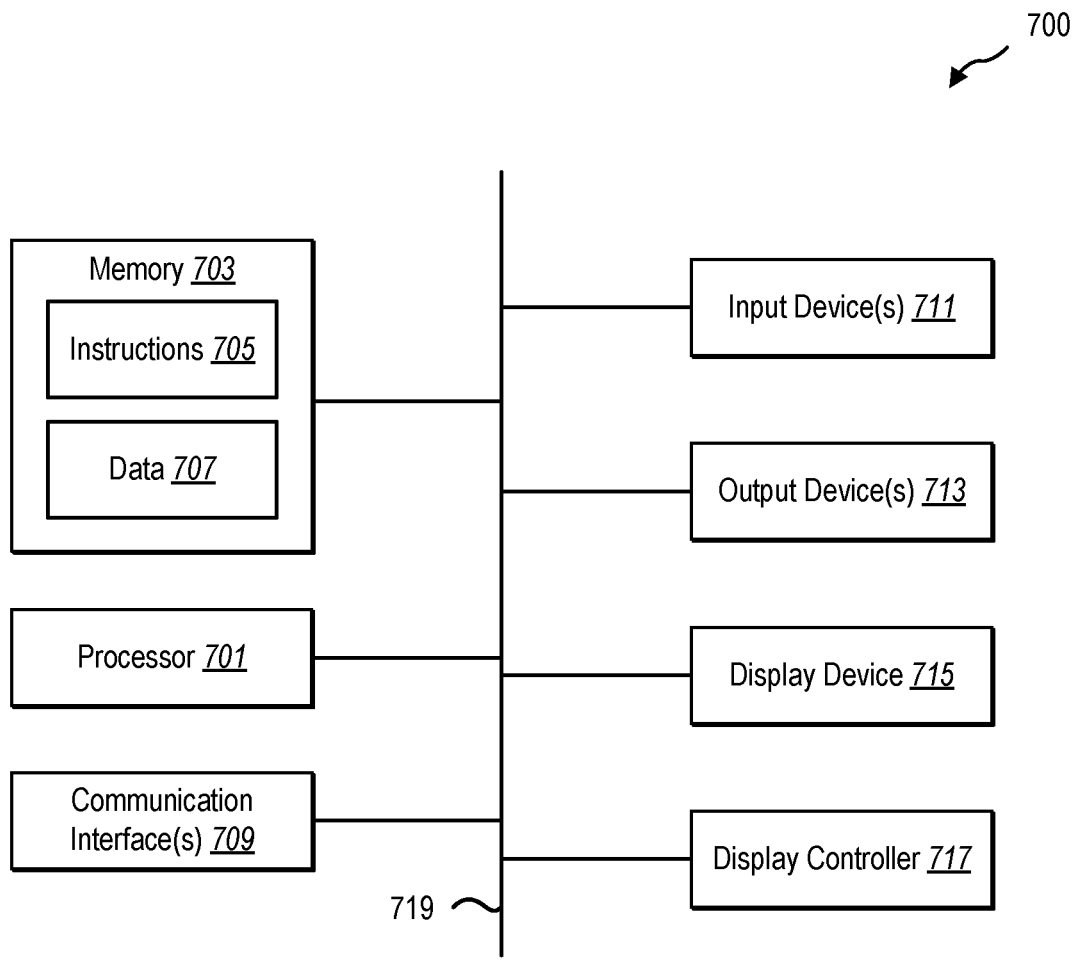
FIG. 7 certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
identifying a maximum thermal power parameter for a system on a chip (SOC) hardware on a computing device;
obtaining sampled values of a real-time power metric and a real-time temperature metric of the SOC hardware over a period of time;
updating a dynamic thermal resistance of the SOC hardware based on a weighted difference of the sampled values of the real-time power metric and the real-time temperature metric of the SOC hardware;
determining, based on the dynamic thermal resistance of the SOC hardware, a thermal setpoint associated with a target temperature of the SOC hardware; and
actuating a cooling device configured to cool the SOC hardware, wherein actuating the cooling device includes modifying a cooling level of the cooling device based on the determined thermal setpoint.

2. The method of claim 1, further comprising identifying a thermal resistance parameter associated with the SOC hardware, the thermal resistance parameter being based on one or more conditions of the SOC hardware.

3. The method of claim 2, wherein determining the dynamic thermal resistance is further based on the thermal resistance parameter.

4. The method of claim 1, wherein determining the thermal setpoint is based on the maximum thermal power parameter for the SOC hardware.

5. The method of claim 1, wherein determining the thermal setpoint is based on a difference between the maximum thermal power parameter and a product of the dynamic thermal resistance and a power offset, the power offset being based on a difference between a maximum power metric of the SOC hardware and the real-time power metric.

6. The method of claim 1, further comprising determining that the real-time power metric has changed a threshold amount over a duration of time, and wherein determining the thermal setpoint is performed in response to determining that the real-time power metric has changed the threshold amount over the duration of time.

7. The method of claim 1, wherein the cooling device is a fan system, and wherein the cooling level of the cooling device is a rotations per minute (RPM) metric of one or more fans of the fan system.

8. The method of claim 7, wherein the RPM metric includes duty cycle instructions that are determined based on the thermal setpoint associated with the target temperature of the SOC hardware.

9. The method of claim 1, wherein the maximum thermal power parameter is based on hardware specifications of the SOC hardware.

10. The method of claim 1, wherein the computing device is a gaming console that is not configured to throttle processor performance of the SOC hardware.

11. The method of claim 1, wherein the SOC hardware is one or more of a graphics processing unit (GPU) block or computing processing unit (CPU) block of an SOC including a plurality of hardware blocks.

12. The method of claim 1, wherein updating the dynamic thermal resistance is based at least on a product of:
a thermal constant of the SOC hardware, and
the weighted difference of the sampled values of the real-time power metric and the real-time temperature metric.

13. A method, comprising:
identifying a maximum thermal power parameter for a first hardware block on a system on a chip (SOC) including a plurality of hardware blocks;
obtaining sampled values of a real-time power metric and a real-time temperature metric of the first hardware block over a period of time;
updating a dynamic thermal resistance of the first hardware block based on a weighted difference of the sampled values of the real-time power metric and the real-time temperature metric of the first hardware block;
determining, based on the dynamic thermal resistance of the first hardware block, a thermal setpoint associated with a target temperature of the first hardware block; and
actuating a cooling device configured to cool the SOC, wherein actuating the cooling device includes modifying a cooling level of the cooling device based on the determined thermal setpoint.

14. The method of claim 13, further comprising determining that the thermal setpoint is a maximum thermal setpoint from a plurality of thermal setpoints determined for respective hardware blocks from the plurality of hardware blocks, wherein modifying the cooling level of the cooling device based on the determined thermal setpoint is further based on the determined thermal setpoint being the maximum thermal setpoint of the plurality of thermal setpoints.

15. The method of claim 13, wherein the first hardware block is one of a graphics processing unit (GPU) block or a computer processing unit (CPU) block on the SOC.

16. The method of claim 13, further comprising identifying a thermal resistance parameter for the first hardware block, the thermal resistance parameter being based on one or more conditions of the first hardware block, and wherein determining the dynamic thermal resistance is further based on the thermal resistance parameter.

17. The method of claim 13, further comprising:
identifying a second maximum thermal power parameter for a second hardware block on the SOC;
obtaining second sampled values of the real-time power metric and the real-time temperature metric of the second hardware block over the period of time;
updating a second dynamic thermal resistance of the second hardware block based on a second weighted difference of these second sampled values of the real-time power metric and the real-time temperature metric of the second hardware block; and
determining, based on the second dynamic thermal resistance of the second hardware block, a second thermal setpoint associated with a second target temperature of the second hardware block,
wherein the actuating the cooling device is based at least on the thermal setpoint of the first hardware block and the second thermal setpoint of the second hardware block.

18. The method of claim 17, wherein the cooling device is a fan and the method further comprises:
determining a first target fan speed based at least on the thermal setpoint for the first hardware block;
determining a second target fan speed based at least on the second thermal setpoint for the second hardware block, and
actuating the fan to a higher of the first target fan speed and the second target fan speed.

19. The method of claim 18, wherein the first hardware block is a central processing unit and the second hardware block is a graphics processing unit.

20. A system, comprising:
at least one processor;
memory in electronic communication with the at least one processor; and
instructions stored in the memory, the instructions being executable by the at least one processor to:
identify a maximum thermal power parameter for a system on a chip (SOC) hardware on a computing device;
obtain sampled values of a real-time power metric and a real-time temperature metric of the SOC hardware over a period of time;
determine a dynamic thermal resistance of the SOC hardware based on a weighted difference of the sampled values of the real-time power metric and the real-time temperature metric of the SOC hardware;
determine, based on the dynamic thermal resistance of the SOC hardware, a thermal setpoint associated with a target temperature of the SOC hardware; and
actuate a cooling device configured to cool the SOC hardware, wherein actuating the cooling device includes modifying a cooling level of the cooling device based on the determined thermal setpoint.

21. The system of claim 20, further comprising instructions being executable by the at least one processor to identify a thermal resistance parameter associated with the SOC hardware, the thermal resistance parameter being based on one or more conditions of the SOC hardware, wherein determining the dynamic thermal resistance is further based on the thermal resistance parameter.

* * * * *